United States Patent [19]
Grubb

[11] 3,772,109
[45] Nov. 13, 1973

[54] SEAL AND CLOSURE FOR ION-SELECTIVE ELECTRODE

[75] Inventor: William T. Grubb, Schenectady, N.Y.

[73] Assignee: General Electric Company, Schenectady, N.Y.

[22] Filed: Feb. 7, 1972

[21] Appl. No.: 224,227

Related U.S. Application Data

[62] Division of Ser. No. 094,284, Dec. 2, 1970, Pat. No. 3,664,537.

[52] U.S. Cl.................... 156/69, 156/286, 324/30
[51] Int. Cl............................................ B29c 27/10
[58] Field of Search.................... 156/69, 285, 286; 324/30; 23/254 R

[56] References Cited
UNITED STATES PATENTS
2,546,208  3/1951  Barton............................ 156/69 X
3,405,019  10/1968  Seil et al......................... 156/286

Primary Examiner—Edward G. Whitby
Attorney—Paul R. Webb, II

[57] ABSTRACT

A closure seal for an ion-selective electrode has a room temperature sealant sealing an ion-selective material disc with a flat surface or with a controlled radius of curvature to one open end of a non-ion selective tube, an apertured member surrounding the disc, sealant and a portion of the tube, one end of the member being flush with the exterior surface of the disc, the same end of the member having an enlarged portion defining an opening adjacent the disc, sealant, and a portion of the tube, and a second room temperature sealant in the opening of the enlarged portion of the member. One such ion-selective electrode includes also a silver wire with a silver chloride portion positioned within the tube, a buffered chloride solution within the tube and in contact with the silver chloride portion of the silver wire, a closure over the opposite end of the tube with an aperture therein and a portion of the silver wire extending through the aperture in the closure to the exterior of the tube. A method of forming such a closure seal is also described.

6 Claims, 3 Drawing Figures

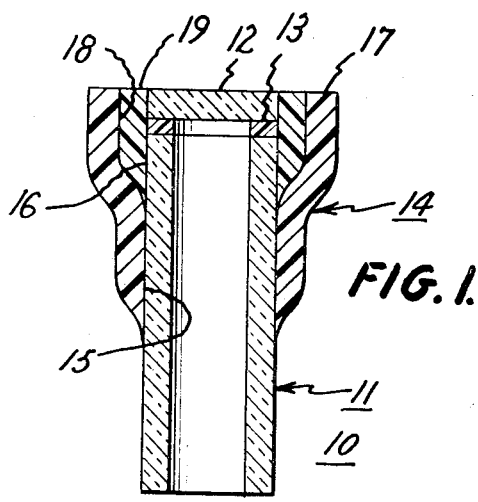
FIG. 1.
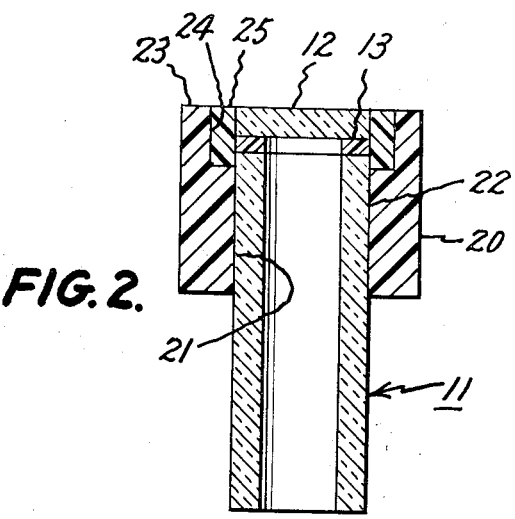
FIG. 2.
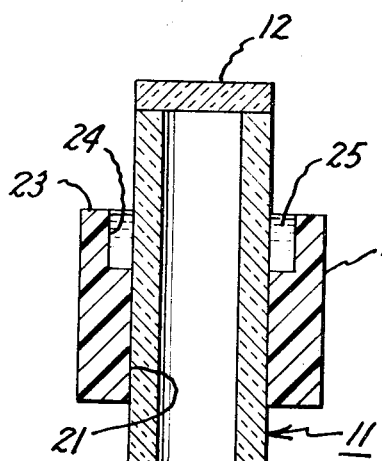
FIG. 3.
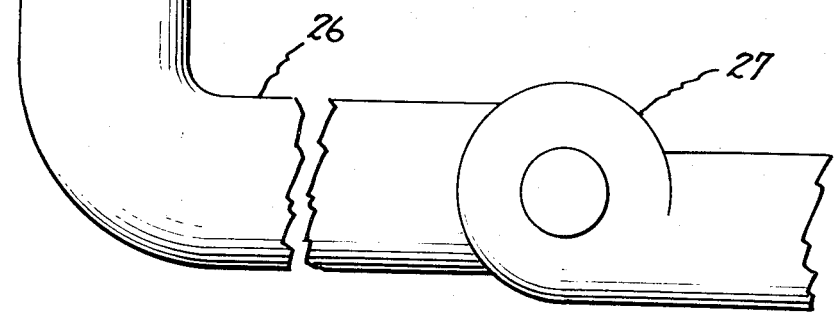

SEAL AND CLOSURE FOR ION-SELECTIVE ELECTRODE

This is a division, of U.S. Pat. application Ser. No. 94,284, filed Dec. 2, 1970 now U.S. Pat. No. 3,644,537.

This invention relates to a closure seal for an ion-selective electrode and more particularly to such a closure seal for an ion-selective electrode employing an ion-selective material disc with a flat surface or with a controlled radius of curvature.

Generally, an ion-selective electrode such as a glass pH electrode consists usually of a tube of non-pH sensing glass onto one end of which has been sealed a thin bulb of a pH sensing glass. The pH sensing glass bulb is generally sealed onto the tubular glass body of the electrode by hand glass blowing techniques which result in fusing at high temperature the pH glass to the glass tubular body of the electrode. The structure is then filled with a reference solution and an internal silver-silver chloride reference electrode is positioned therein to establish a fixed internal reference potential.

The above prior art approach of sealing the pH sensing glass bulb to the glass tube at high temperature is not suitable for the incorporation of preformed discs or other configurations of pH sensitive glass onto the glass tube of a glass electrode without thermally deforming them or for the sealing of heat sensitive material into electrode structures. Flat surface discs of ion-selective material or those with a controlled radius of curvature are desirable for the fabrication of accurately dimensioned pH electrodes for incorporation into accurately dimensioned sample chamber geometries as in clinical pH and blood gas analyzers. However, the hand glass blowing techniques cannot provide accurately dimensioned electrodes. The closure seal for such an electrode with a flat surface disc or with a controlled radius of curvature disc poses problems of maintaining high electrical resistance of the seal in contact with aqueous solutions. Therefore, excellent adhersion of the disc to the tube, and a void-free seal must be achieved in manufacturing the electrode. The term "disc" is used in the present application to include both a flat surface disc and a controlled radius of curvature disc.

My present invention is directed to an improved closure seal for an ion-selective electrode which eliminates the above problems whereby the device is suitable for biomedical, environmental control and other applications.

The primary object of my invention is to provide a rugged and dependable closure seal for an ion-selective electrode employing a disc of ion-selective material.

In accordance with one aspect of my invention, a closure seal for an ion-selective electrode comprises a tube of non-ion selective material, a disc of ion-selective material, a room temperature sealant sealing the disc to one open end of the tube, an apertured member surrounding the disc, sealant and a portion of the glass tube, one end of the member being flush with the exterior surface of the disc, the member having an enlarged portion defining an opening adjacent the disc, sealant, and an associated portion of the tube, and a second room temperature sealant in the opening of the enlarged portion of the member.

These and various other objects, features and advantages of the invention will be better understood from the following description taken in connection with the accompanying drawing in which:

FIG. 1 is a sectional view of a closure seal for an ion-selective electrode made in accordance with my invention;

FIG. 2 is a sectional view of a modified closure seal for an ion-selective electrode made in accordance with my invention; and FIG. 3 is a partial sectional view of components and apparatus to form a closure seal in accordance with the method of my invention.

In FIG. 1 of the drawing there is shown generally at 10 a closure seal for an ion-selective electrode made in accordance with my invention. A tube 11 of non-ion selective material, such as glass has a disc 12 of ion-selective material, such as a special ion-selective glass, sealed to one open end of glass tube 11 by a room temperature sealant 13, such as, a room temperature vulcanizing silicone sealant. A member 14 of heat-shrinkable polyolefin with an aperture 15 surrounds disc 12, sealant 13 and an associated portion 16 of glass tube 11. One end 17 of member 14 is flush with the exterior surface of disc 12. Member 14 has an enlarged portion defining an opening 18 adjacent disc 12, sealant 13, and an associated portion of tube 11. A second room temperature sealant 19, such as, a room temperature vulcanizing silicone sealant fills opening 18 of the enlarged portion of member 14.

In FIG. 2 of the drawing there is shown a modified closure seal for an ion-selective electrode embodying my invention which employs a similar glass tube 11 of non-ion selective glass with a disc 12 of ion-selective glass sealed thereto at one end by a room temperature sealant 13, a room temperature vulcanizing silicone sealant. A member 20 of a material such as Plexiglas plastic with an aperture or bore 21 surrounds disc 12, sealant 13, and an associated portion 22 of glass tube 11. One end 23 of member 20 is flush with the exterior surface of disc 12. Member 20 has an enlarged portion defining an opening 24 in the form of a counterbore adjacent disc 12, sealant 13 and an associated portion of tube 11. A second room temperature sealant 25, such as a room temperature vulcanizing silicone sealant, fills the opening 24 of the enlarged portion of member 20.

In FIG. 3 of the drawing there is shown the components and apparatus to form a closure seal in accordance with the method of my invention. A tube 11 of non-ion selective glass has a disc 12 of ion-selective glass positioned at the upper end thereof. A member 20 of Plexiglas plastic with an aperture 21 is shown positioned initially around glass tube 12. Member 20 has an enlarged portion defining an opening 24 at its upper end. A vacuum line 26 is connected at its one end to the opposite end of glass tube 11 and at its other end to a vacuum pump 27 for evacuating the chamber or interior of tube 11.

In accordance with my method for forming a closure seal, pump 27 is turned on thereby evacuating the chamber defined by tube 11 and retaining disc 12 on the one end of tube 11. A room temperature sealant 25 in liquid form is added to and fills opening 24 of the enlarged portion of member 20, which member is then aligned by moving it manually or automatically along the exterior surface of glass tube 11 until end 23 of member 20 and the top or exterior surface of sealant 25 are substantially flush with the exterior surface of disc 12. In this manner a portion of room temperature sealant 25 is drawn from opening 24 in the enlarged portion of member 20 into the space between the mating surfaces of disc 12 and the end of glass tube 11. In this process of evacuation, voids in the sealants in both opening 24 and in the material drawn between the mating surfaces of disc 12 and tube 11 are eliminated. The pump is then turned off and the vacuum is broken. The sealant between the end of glass tube 11 and disc 12 and the sealant in an enlarged opening portion 24 are allowed to cure thereby forming the closure seal.

Furthermore, in accordance with my method for forming a closure seal as shown in FIGS. 1 and 2 of the drawing, a tube 11 of non-ion selective glass is provided and has positioned at one end thereof a flat surface disc 12 of ion-selective glass. Disc 12 is sealed to the end of tube 11 with a room temperature sealant 13, such as a room temperature vulcanizing silicone. An apertured member 14 is positioned around glass disc 12, sealant 13, and associated portion 16 of glass tube 11. One end 17 of member 14 is positioned flush with the exterior surface of disc 12. Member 14 is provided with an opening 18 in its enlarged portion adjacent disc 12, sealant 13 and an associated portion of the tube. Opening 18 is filled with a second room temperature sealant 19, such as a room temperature vulcanizing silicone, and both sealants are allowed to cure thereby providing a closure seal.

I discovered unexpectedly that my above method of providing a closure seal and the closure seals formed thereby provided closure seals which were rugged, free of voids, and do not possess electrical leakage so as to partially short across the high electrical resistance of the ion-selective glass disc. The closure seals were manufactured easily at low cost.

I found further that when the closure seal of FIG. 1 employed silicone rubber as the sealant the sealant 19 formed a cushion protecting the ion-selective disc 12 against mechanical damage. I found further that sealant 13 especially when it consisted of silicone rubber or other non-rigid material makes it unnecessary for the ion-selective disc 12 and the tube 11 to be matched in their thermal expansion characteristics. The latter is an important requirement when the electrode is fabricated by conventional glass blowing methods.

I found further that the non-ion selective tube, the ion-selective disc and the apertured member can be formed from a wide variety of materials. Suitable non-ion selective materials for the tube include a wide variety of non-ion selective glasses and plastics. The apertured member can be of various materials including glasses and plastics. Suitable ion-selective disc materials include pH sensing glass, sodium-ion selective glass, potassium-ion selective glass, and various ion-selective polymers such as anion exchange polymer membranes, and cation exchange polymer membranes.

I found further that I could form an ion-selective electrode which can be employed in a clinical pH or blood gas analyzer by using the closure seal of the present invention. In one embodiment a silver wire with a silver chlorided portion is positioned within glass tube 11 and is placed in contact with a buffered chloride reference solution contained within tube 11. The opposite end of the tube is sealed by a closure with an aperture therein through which the opposite end of the silver wire extends. If desired a shrinkable polyolefin tube can be employed for the closure. In another ion-selective electrode the closure seal of my invention is employed wherein a silver wire without a silver chlorided portion is positioned within glass tube 11. In the second type of ion-selective electrode, no buffered chloride reference solution is required. A silver filled resin, which is commercially available, is positioned in the glass tube adjacent to and in contact with the interior surface of ion-selective glass disc 12. One end of the silver wire is positioned in and in contact with the silver filled resin while the opposite end extends out through a closure at the opposite end of the glass tube. Examples of closure seals and ion-selective electrodes employing such closure seals made in accordance with my invention are as follows:

EXAMPLE 1

A closure seal was made generally in accordance with FIG. 1 of the drawing and as described above a tube of non-ion selective glass with a diameter of 0.2 inch was ground flat at one end and subjected to ultrasonic cleaning. The flat surface disc of pH sensing glass with a resistivity of $10^{11.1}$ ohm·cm was provided which was about 0.2 inch in diameter and 0.0045 inch thickness. This disc was cleaned ultrasonically in a similar manner, soaked in concentrated sulfuric acid and rinsed in distilled water and dried. One end of the glass tube was coated with a thin layer of a room temperature vulcanizing silicone sealant. The seal had an electrical resistance of more than $10^{13}$ ohms. This room temperature vulcanizing silicone sealant is available commercially from the General Electric Company, Waterford, New York under the silicone sealant designation of RTV 108. The end of the glass tube with a layer of sealant was pressed down onto the glass disc and cured for one hour. A vacuum was applied to the open end of the tube for one minute. The sealant was then allowed to cure overnight. An apertured member in the form of a plastic collar of polyolefin heat shrinkable tubing was slipped over the exterior of the glass tube from the open end. The member had an enlarged portion defining an opening nearest the disc. A second room temperature sealant identical to the first sealant was provided and filled the opening of the enlarged portion. The member was then moved along the exterior surface of the tube towards the sealed end of the tube until the one end of the member was flush with the exterior surface of the disc and the opening of the enlarged portion filled with room temperature vulcanizing silicone was adjacent the disc, the sealant and an associated portion of the tube. The filling of the opening of enlarged opening portion and then moving the member to the sealed end of the tube provided a bubble free collar of sealant material in the opening of the enlarged portion of the member. The closure seal was then allowed to cure for an additional 24 hours. After curing there was provided a rugged, compact closure seal.

EXAMPLE 2

An ion-selective electrode was formed incorporating the closure seal made in Example 1. The non-ion selective glass tube was filled from its open end with a 0.1 molar pH 7.0 phosphate buffer in 0.14 molar isotonic saline with a trace of a buffer preservative added. A silver wire with a chlorided silver portion was positioned within the tube in contact with the buffer solution and extended out from the opposite initially opened end of the tube through an aperture in a polyolefin shrink tube sealed on that end. This structure resulted in an ion-selective electrode for measuring hydrogen ion activity.

EXAMPLE 3

The electrode formed above in Example 2 was tested in a series of buffers in which there was plotted millivolts versus a 3N silver chloride reference electrode as a function of pH. The buffers were guaranteed to the given pH ± 0.02 pH units. The electrode functioned as a pH sensor with a slope of 56 millivolts per pH unit.

While other modifications of the invention and variations thereof which may be employed within the scope of the invention have not been described, the invention is intended to include such as may be embraced within the following claims:

1. A method of forming a closure seal for an ion-selective electrode which comprises providing a tube of non-ion-selective material, positioning an apertured member around the tube, the member having an enlarged portion defining an opening at one end, positioning a disc of ion-selective material at one end of the tube, applying a vacuum to the opposite end of the tube, filling the opening of the enlarged portion with a room temperature sealant, aligning the member along the exterior surface of the tube to contact the room temperature sealant with the mating surfaces of the disc and of the associated end portion of the tube and positioning the one end of the member flush with the exterior surface of the disc, drawing room temperature sealant from the opening in the enlarged portion between the mating surfaces of the disc and the associated end of the glass tube, terminating the vacuum at the opposite end of the tube, and allowing the room temperature sealants to cure thereby providing a closure seal.

2. A method of forming a closure seal as in claim 1, in which the sealant is a room temperature vulcanizing silicone.

3. A method of forming a closure seal as in claim 1, in which the sealant is a room temperature curing epoxy resin.

4. A method of forming a closure seal for an ion-selective electrode which comprises providing a tube of non-ion selective material, positioning a disc of ion-selective material at one end of the tube, sealing the disc to the end of the tube with a room temperature sealant, positioning an apertured member around the tube with one end of the member flush with the exterior surface of the disc, the member having an enlarged portion defining an opening at its end nearest the disc, filling the opening of the enlarged portion of the member with a second room temperature sealant, and allowing the room temperature sealant to cure thereby providing a closure seal.

5. A method of forming a closure seal as in claim 4, in which both sealants are room temperature vulcanizing silicones.

6. A method of forming a closure seal as in claim 4 in which both sealants are room temperature curing epoxy resins.

* * * * *